US006517874B2

(12) United States Patent
Schuhmann

(10) Patent No.: US 6,517,874 B2
(45) Date of Patent: Feb. 11, 2003

(54) UTILIZATION OF TRANSGLUTAMINASES FOR THE PRODUCTION OF BAKED PRODUCTS WITH A LOW WHEAT CONTENT

(75) Inventor: Frank Schuhmann, Detmold (DE)

(73) Assignee: AB Enzymes GmbH, Darmstadt (DE)

( * ) Notice: Subject to any disclaimer, the term of this patent is extended or adjusted under 35 U.S.C. 154(b) by 0 days.

(21) Appl. No.: 09/954,158

(22) Filed: Sep. 18, 2001

(65) Prior Publication Data

US 2002/0061344 A1 May 23, 2002

(30) Foreign Application Priority Data

Sep. 20, 2000 (DE) .......................................... 100 46 605

(51) Int. Cl.$^7$ ................................................ A21D 8/04
(52) U.S. Cl. ........................... 426/18; 426/61; 426/653; 426/555
(58) Field of Search ........................... 426/61, 272, 653, 426/622, 549, 555, 18

(56) References Cited

U.S. PATENT DOCUMENTS

| | | | |
|---|---|---|---|
| 4,917,904 A | 4/1990 | Wakameda et al. | |
| 5,156,956 A | 10/1992 | Motoki et al. | |
| 5,252,469 A | 10/1993 | Andou et al. | |
| 5,279,839 A | 1/1994 | Gottmann et al. | |
| 5,670,192 A | 9/1997 | Budolfsen et al. | |
| 5,686,124 A | 11/1997 | Moller et al. | |
| 5,698,245 A | * 12/1997 | Tanaka et al. ................. | 426/10 |
| 5,846,585 A | * 12/1998 | Ohmura et al. ............. | 426/241 |
| 5,866,180 A | 2/1999 | Budolfsen et al. | |
| 5,907,031 A | 5/1999 | Soeda et al. | |
| 5,928,689 A | 7/1999 | Milkowski et al. | |
| 5,968,568 A | 10/1999 | Kuraishi et al. | |
| 6,013,498 A | 1/2000 | Yokoyama et al. | |
| 6,042,851 A | 3/2000 | Matsuura et al. | |
| 6,399,117 B1 | * 6/2002 | Hoff et al. ..................... | 426/2 |

FOREIGN PATENT DOCUMENTS

| | | |
|---|---|---|
| EP | 0 379 606 B2 | 8/1990 |
| EP | 0 492 406 * | 5/1995 |
| EP | 0 745 670 A1 | 12/1996 |
| EP | 0 847 701 A3 | 6/1998 |
| EP | 0 847 701 A2 | 6/1998 |
| EP | 0 870 434 A2 | 10/1998 |
| EP | 0 870 434 A3 | 10/1998 |
| EP | 0 898 895 A2 | 3/1999 |
| EP | 0 898 895 A3 | 3/1999 |
| EP | 0 938 845 A1 | 9/1999 |
| EP | 0 948 905 A3 | 10/1999 |
| EP | 0 948 905 A2 | 10/1999 |
| EP | 0 950 665 A1 | 10/1999 |
| EP | 0 963 704 A2 | 12/1999 |
| EP | 0 963 704 A3 | 12/1999 |
| EP | 0 966 887 A1 | 12/1999 |
| EP | 1 121 864 A1 | 8/2001 |
| JP | 11-243843 * | 4/1999 |
| JP | 125770 A * | 5/2000 |
| JP | 253841 A * | 9/2000 |
| WO | WO 89/07398 | 8/1989 |
| WO | WO 93/19610 | 10/1993 |
| WO | WO 93/22930 | 11/1993 |
| WO | WO 96/06931 | 3/1996 |
| WO | WO 96/22366 | 7/1996 |
| WO | WO 97/01961 | 1/1997 |
| WO | WO 99/29186 | 6/1999 |
| WO | WO 99/51723 | 10/1999 |

OTHER PUBLICATIONS

Die Backschule Fachlehre fuer Baecker, Band 2, Bueskens, W. Girardet Buchverlag GmbH, Essen Jan. 1984.
Japanese Patent No. JP 11276056, Oct. 12, 1999; Application No. JP 1998–102229 (English Abstract only).
Japanese Patent No. JP 11155468, Jun. 15, 1999; Application No. JP 1997–325958, Nov. 27, 1997 (English Abstract Only).
Japanese Patent No. JP 11056303, Mar. 2, 1999; Application No. JP 1997–222133, Aug. 19, 1997 (English Abstract only).
Japanese Patent No. 2000139384, May 23, 2000; Application No. JP 1998–319461, Nov. 10, 1998 (English Abstract only).
Japanese Patent No. 11137254, May 25, 1999; Application No. JP 1997–306155, Nov. 7, 1997 (English Abstract only).
Japanese Patent No. JP 05023744, Apr. 5, 1993 (English Abstract only).
Japanese Patent No. JP 08056597, Application No. JP 94–196532 (English Abstract only) May 1996.
Japanese Patent No. JP 07327584, Application No. JP 96–072250 (English Abstract only) Feb. 1996.
Japanese Patent No. JP 07184529, Application No. JP 95–287858 (English Abstract only) Jul. 1995.
Japanese Patent No. JP 09191820, Jul. 29, 1997; Application No. JP 96–6393, Jan. 18, 1996 (English Abstract only).
Japanese Patent No. JP 09071764, Mar. 18, 1997, Application No. JP 96–141191, May 13, 1996 (English Abstract only).
Japanese Patent No. JP 08051944, Feb. 27, 1996; Application No. JP 94–189229, Aug. 1, 1994 (English Abstract only).
Japanese Patent No. 09154512, Application No. JP 97–367019 (English Abstract only).

(List continued on next page.)

Primary Examiner—Keith Hendricks
(74) Attorney, Agent, or Firm—Oblon, Spivak, McClelland, Maier & Neustadt, P.C.

(57) ABSTRACT

A flour useful for the production of baked goods containing transglutaminase and wheat flour yields dough with properties for automated processing and baked goods with larger volume. The wheat flour represents 1 to 50 wt.-% of the flour with the remainder being one or more non-wheat flours. A method for the production of baked goods containing both wheat and non-wheat flours utilizing a transglutaminase enzyme.

28 Claims, No Drawings

OTHER PUBLICATIONS

Japanese Patent No. 08256715, Application No. JP 96–500312 (English Abstract only) Oct. 1996.

Japanese Patent No. 06225717, Application No. JP 94–298759 (English Abstract only) Aug. 1994.

Japanese Patent No. 06014733, Application No. JP 94–061450 (English Abstract only) Jan. 1994.

Japanese Patent No. 05244887, Application No. JP 93–338872 (English Abstract only) Sep. 1993.

* cited by examiner

UTILIZATION OF TRANSGLUTAMINASES FOR THE PRODUCTION OF BAKED PRODUCTS WITH A LOW WHEAT CONTENT

BACKGROUND OF THE INVENTION

1. Field of the Invention

The invention relates to technological improvements in the production of baked products with low wheat content. In particular the invention describes the utilization of transglutaminase compounds for the production of baked products with a wheat content derived from flour of 1 to 50% by weight.

2. Discussion of the Background

Problems with mechanical dough processing and product quality are known to occur during the manufacture of bread with a low wheat content. In dough types made from wheat, vegetable gluten forms a cellular gluten network and develops a protein film throughout the whole dough. No such gluten network is formed in dough with a low wheat content. The lack of a gluten network is the reason why doughs low in wheat content are not as elastic as wheat doughs. Rye doughs in particular, but also doughs made from special flours, are not elastic. These doughs keep the shape they are given and are sticky and plastic. The presence of rye flour or special flour inhibits the formation of vegetable gluten through swelling pentosans which are believed to prevent the formation of gluten strands. The pentosans envelop particles in the dough such as hydrated rye flour by forming a thick glutinous liquid. The larger proportion of soluble compounds in wheat doughs in comparison to doughs with special flours is also thought to contribute to the differences in dough properties. There is no information available about dough formation in doughs containing rye part wheat. However, rye content is the decisive factor in the properties of the dough and the baked product when a dough mixture containing rye is used. For example, in common practice dough is leavened with a rye flour proportion of just 20%. The dough properties of bread dough containing rye part wheat resemble those of unblended rye flour. This leads to the conclusion that in doughs made from rye flour blends, no uninterrupted protein film forms due to the high pentosan content. The lack of such a protein film results in a low consistency of fermentation in bread made from rye flour or rye flour blends. This in turn leads to flat loaves with insufficient loaf volume.

Special flours are flour types which are not usually suitable for making bakable dough. Such special flours, which can be made from other cereal types but also from leguminous or other plants, contain proteins which are not able to form an uninterrupted network because most of the proteins are soluble. For this reason, most of the problems which occur during the manufacture of rye bread are also encountered with other special flours.

An amylase and pentosanase preparation powder (VERON® HE made by Röhm GmbH) has been used for improving the properties of rye dough and special flour doughs. This product has been used for the treatment of high ammylogram rye flours. However, use of this enzyme preparation resulted in a softer dough and noticeably flatter loaves. Hexose oxidase and glucose oxidase have also been used during the production of bread from blended rye flour (e.g. Poulsen, C. H.; Borch Soe: Strong Effect of Hexose Oxidase on the Stickiness of Mixed Rye/Wheat Sour Dough, Helsinki Meeting Dec. 8, 1999 to Dec. 10, 1999, Congress: 2nd European Symposium on Enzymes in Grain Processing). These enzymes achieved reduced dough stickiness. The effect on loaf shape and fermentation is however not described. Furthermore, oxidases are known to react with the carbon hydrates in the flour but not the proteins. Therefore, all attempts utilizing the current state of technology for improving the quality of dough low in wheat have been unsatisfactory.

DETAILED DESCRIPTION OF THE INVENTION

The present invention relates to the task of providing the means and methods for improving doughs that are low in wheat content. In particular, according to this invention, the extensibility of the dough and its gas retention properties will be improved. Furthermore, the means and methods described in the invention are used to improve the baking properties in automated processing, in particular stickiness. The means and methods described in the invention also improve the quality of the baked product, particularly its volume. The baked products should not show any faulty flavor or properties giving rise to toxicological concern. In addition, the means and methods described in the invention are to be generally recognized as safe from a toxicologic and food regulatory standpoint.

Surprisingly, it was found that the addition of transglutaminase to doughs low in wheat significantly improved the properties of the dough and the baked products derived therefrom. The stickiness of the doughs is reduced so that they can be easily mechanically processed. Because of the improved gas retention in the dough, bread volume is noticeably increased. In addition, the stability of the fermentation in the shaped dough is increased. The final fermentation time can therefore be increased by up to 20%. The resulting baked product will nevertheless exhibit a very good shape. Thus allowing a great deal of flexibility at the bakery.

The present invention relates to both the use of transglutaminase for the production of baked products with a wheat content between 1 and 50% in addition to one or more flours other than wheat flour(s), as well as a method for the production of the corresponding baked products which are characterized by the fact that they include transglutaminase as an enzyme component. The invention further covers a baking flour with a wheat content of 1 to 50% by weight of the flour components further containing a transglutaminase. This baking flour may contain flour made from any type of wheat in its wheat component and any type of non-wheat flour in the non-wheat component. The baking flour may be part of a baking mixture.

The effect of the transglutaminase used in the invention was surprising, as in the past it was assumed that transglutaminases could only be successful with doughs of wheat component greater than 50% (EP 0 492 406). The effect of transglutaminase in wheat dough arises from the generation of new connections between the amino acids glutamine and lysine contained in the flour protein. Because of the high content of pentosans which form a glutinous liquid around the rye flour particles, or of soluble proteins in special flours, it was surprising, and not obvious, that transglutaminase would also have such favourable effects in doughs that are low in wheat.

Doughs covered by the invention contain a wheat proportion of 1–50%, preferably 5–50%, more preferably 10–50% and even more preferably 30–50%, where the percentages refer to weight, with the flour component of the dough being 100%. Throughout this disclosure all ranges and subvalues between the stated ranges are included. Any type of wheat may be used for this wheat component, such as dinkel, durum wheat or low-allergen wheat. The non-wheat flour can be any type of flour which on its own does not possess any, or only insufficient, baking properties. Examples are oat flour, barley flour, maize flour, buckwheat flour, millet flour, rye flour, amarath flour, quinoa flour and other non-cereal flours of plant origin, such as potato flour, soya bean flour or leguminous plant flour. These special flours can be used individually or in combination. The preferred non-wheat flour is rye flour. Combinations of non-wheat flour types which can be used are, for example, barley/oats/rye or oats/buckwheat or rye/potato starch. The proportion of non-wheat flour is 50–99% by weight, preferably 50–95% by weight, more preferably 50–90% by weight, even more preferably 50–70% by weight, in all cases with respect to the flour component, total flour content is 100%. In addition, the dough for the baked product may contain the usual ingredients and spices. The dough is processed in the normal way for producing the intended baked products. These baked products may also be filled.

The dosage for the transglutaminase depends on the properties of the individual flour. An enzyme dose between 5 TGU and 5000 TGU is preferred, more preferred is 10–2000 TGU, even more preferred is 30 to 300 TGU per 100 kg of flour depending on the flour blend and the dough processing.

For example, the dosage for 50% rye flour is 70–100 TGU per 100 kg of flour, for 60% rye flour it is 90–150 TGU per 100 kg of flour, for 70% rye flour is 120–200 TGU per 100 kg of flour, for 80% rye flour is 200–300 TGU per 100 kg of flour. For the special flour types the dosage range is between 100 TGU and 5000 TGU, always for 100 kg flour, but more preferably between 300 TGU and 600 TGU depending on the flour type used. The precise dosage for the flour or flour blend can easily be determined by one skilled in the art by means of simple routine experiments.

The enzyme preparation with transglutaminase activity can, on its own or together with other ingredients, be added at any stage after the grinding of the flour (each flour alone or mixed together) and before the dough processing. The enzyme preparation can also be added to the leaven. The enzyme preparation is preferably added together with the baking ingredients. It is also possible to add the transglutaminase to the baking additives for the appropriate dough types. The dough may also contain other commonly used baking additives such as non-transglutaminase enzymes, e.g. amylases, xylanases, pentosanases, hemicellulases, cellulases, endoglucanases, β-glucanases, phospholipases, lysophospholipases, phytases, phosphatases, lipases, lipoxygenases, oxidases or peroxidases. Furthermore, other commonly used additives used in baking such as swellable types of flour, salt, sugar, emulsifiers, organic acids, like lactic acid and acetic acid, citric acid and tartaric acid, vitamin C, etc. may be added.

In preparing the initial mixed flour of the invention there is no special order of addition of ingredients (wheat flour, transglutaminase, non-wheat flour). However, and as mentioned above, the transglutaminase should not be ground for best results. The phrase "mixing a transglutaminase, a wheat flour and a non-wheat flour" includes all orders of addition, meaning that any two can be combined and optionally mixed followed by the addition of the third with mixing, that all these can be combined followed by mixing, that the two may be provided in pre-mixed form and the third added and mixed, etc.

The transglutaminases used as described in the invention are preferably produced by cultures of micro-organisms, e.g. by mould fungi or bacteria. The enzyme may also be of plant or animal origin. Transglutaminases produced recombinantly can also be used. A transglutaminase produced from *Streptoverticillium mobaraense*, IFO 13819 (as described in U.S. Pat. No. 5,156,956 and EP 0 379 606 B2; both hereby incorporated in their entirety by reference) is preferred.

Doughs made from part rye flour can be produced both by direct and by indirect processing. For direct processing organic acids such as lactic acid, acetic acid or citric acid and/or dried leaven are added. For the indirect processing, in the first stage a dough with unprocessed leaven is used. The dough may, in addition, contain yeast. It is also possible to combine the processing methods.

The results of the baking tests show that the transglutaminase is of no effect on doughs made purely from rye flour (see table 1 in example of control experiment 1). Changes do not become visible in the dough nor in the loaf. When testing blends containing 70% rye flour, a noticeable improvement in the properties of dough and baked product are evident, and the degree of comminution rate is of no relevance (tables 2 and 3). With an enzyme dose of just 200 TGU per 100 kg of flour a very good volume increase of 6 vol. % is reached.

Experiments with different proportions of rye flour show that the loaf volume is noticeably increased by an addition of transglutaminase (table 4). A volume increase of up to 7 vol. % can be achieved. The loaf shape and dough stability is even improved with a rye flour proportion of 80%. The transglutaminase results in a major reduction in the stickiness of the dough. The best results are achieved with a proportion of rye flour between 60 and 70%.

In addition, experiments with both types of dough processing were carried out(table 5 and 6). In both cases the transglutaminase had a very noticeable effect on the properties of the dough and the baked product.

Experiments investigating the effect of the transglutaminase on the fermentation stability are shown in table 7. These results show that the effect of the transglutaminase permits a lengthening in the fermentation time of up to 20%. While loaves without transglutaminase are flat and must be regarded as no longer acceptable, the loaves with transglutaminase showed a very pleasing loaf shape and a high loaf volume.

The combination of transglutaminase with several other typical baking enzymes is described in tables 8 to 10. The combination of the transglutaminases with other enzymes has the advantage that, in addition to the increased loaf volume, the improved loaf shape and the improved dough stability, the pore structure in the crust is improved as well.

In addition, baking tests with special flours were carried out(see tables 11 and 12). The results are similar to those with the bread types made from rye flour blends. Here, again, loaves with very pleasing shapes and high volumes were produced. The dough was also improved. The dough is more easily processed because it is less moist and more elastic.

The transglutaminase activity of an enzyme preparation can be determined by means of the colorimetric hydroxamate test. Here 1 TGU/g is defined as the quantity of an enzyme which under standardized conditions, at 37° C. and pH 6.0 with 0.2 M tris-HC1 buffer, releases 1 $\mu$mol hydroxyamine acid.

One cellulase activity unit (CU) is defined as the enzyme activity which lowers the viscosity in the preparation with a standard CMC solution in the defined measuring range and under the stated reaction conditions (30° C., pH=4.5, t=11 min and volume flow of the reactive solutions) by $\Delta 1 * \eta^{-1} = 45.11 * 10^{-6}$.

$\Delta 1 * \eta^{-1}$ is the difference between the reciprocal value of the viscosity of the standard CMC solution after being exposed to the enzyme and the reciprocal value of the viscosity of the untreated CMC solution.

The activity concentration unit: CU mg$^{-1}$

The xylan fragments released by the enzymatic dissociation of xylan are determined photometrically at 412 nm with p-hydroxybenzoic acid hydrazide (PAHBAH). 1 Xy1H unit corresponds to the quantity of enzyme which will release 1 μmol reactive equivalent of xylose by dissociation of xylan within one minute at 30° C. under standard conditions.

EXAMPLES

The invention is now explained by means of the following examples.

Loaf volume or baked volume is determined in the usual way by the displacement of rape seeds and is quoted in ml. The usual criteria for the assessment of the dough were used. The dough stability is expressed using the following criteria: dry, too firm, firm, somewhat firm, just firm, normal, just soft, somewhat soft, too soft, flowing, moist. The stickiness of the dough was divided into the categories very sticky, sticky, somewhat sticky, just sticky.

For the criteria for the assessment of the loaf shape were the properties flat, somewhat flat, just flat, normal, just round, somewhat round and round were used.

All the bread types containing rye flour were baked as loaves not in tins and not in contact with each other. In all the experiments the following conditions were used:

Autolyse period: 20 min Dough per loaf: 850 g Final fermentation time: 35 min Kneading times: 5 min slow and 1 min rapid Conditions in the fermentation chamber: 32° C., 85% air humidity Oven temperature: 260° C. falling TG=transglutaminase: derived from *Streptoverticillium mobaraense*, IFO 13819

Flour: Flour grades are those known in the art (described in Bueskens, "Die Backschule: Fachlehre fuer Baecker", Band 2, W. Giradet Buchverlag GmbH, Essen Germany (1987), pp 29–30, hereby incorporated by reference).

Example of a Control Experiment 1
Effect of Transglutaminase on Pure Rye Doughs Bread was made using a dough with the following recipe:

Rye bread:

| | |
|---|---|
| 100 kg | Rye flour, grade 997 |
| 79 kg | water |
| 3 kg | yeast |
| 2.5 kg | salt |
| 2.5 kg | organic acids |

The results are shown in table 1 below. The quoted enzyme dosage is with respect to 100 kg of flour; the acidifiers used for the dough were organic acids. The loaf volume (%) refers to the loaf volume (ml) achieved in the control.

TABLE 1

| | Control 0 TGU | TG 500 TGU | TG 1000 TGU | TG 1500 TGU | TG 2000 TGU |
|---|---|---|---|---|---|
| Baked volume | 100% | 99% | 100% | 101% | 100% |
| Dough properties | soft sticky plastic | soft sticky plastic | soft sticky plastic | soft sticky plastic | soft sticky plastic |
| Loaf shape | somewhat flat | somewhat flat | somewhat flat | somewhat flat | somewhat flat |

The results listed above show that transglutaminase has no effect with pure rye dough.

Example 1
Comparison of the effect of Transglutaminase on Rye flour blends with different Comminution Grades.

Bread was made from a dough with the following recipe:

Blended rye flour bread 70:30

| | |
|---|---|
| 70 kg | Rye flour, grade 997 or grade 1150 |
| 30 kg | Wheat flour, grade 550 |
| 73 kg | water |
| 3 kg | yeast |
| 2.5 kg | salt |
| 2.5 kg | organic acids |

A blended rye flour bread containing 70% rye flour and 30% wheat flour was baked. The enzyme doses are with respect to 100 kg of flour. The dough was acidified by means of organic acids. The loaf volume (%) is given with respect to the loaf volume (ml) determined in the control. The results are shown in tables 2 and 3 below.

TABLE 2

Rye flour grade 997

| | Control 0 TGU | TG 50 TGU | TG 100 TGU | TG 200 TGU | TG 300 TGU |
|---|---|---|---|---|---|
| Baked volume | 100% | 102% | 103% | 106% | 106% |
| Dough properties | somewhat soft, sticky | somewhat soft, somewhat sticky | somewhat soft, somewhat sticky | somewhat to just soft, somewhat to just sticky | just soft, just sticky |
| Loaf shape | somewhat flat | normal | normal | normal to just round | just round |

TABLE 3

Rye flour grade 1150

| | Control 0 TGU | TG 50 TGU | TG 100 TGU | TG 200 TGU | TG 300 TGU |
|---|---|---|---|---|---|
| Baked volume | 100% | 101% | 103% | 105% | 106% |
| Dough properties | soft - somewhat soft, sticky | somewhat soft, somewhat sticky | somewhat soft, somewhat sticky | somewhat to just soft, somewhat to just sticky | just soft, just sticky |
| Loaf shape | somewhat flat | normal | normal | normal to just round | just round |

The results shown above indicate that the comminution grade of the rye flour used is of less significant relevance.

Example 2
Effect of Transglutaminase with Varying Rye Flour Content

The following dough types with varying rye flour content (grade 1150) were used for baking bread. 300 TGU per 100 kg of flour were added.

| Blended rye flour bread 70:30 | Blended rye flour bread 80:20 |
| --- | --- |
| 70 kg rye flour grade 1150<br>30 kg wheat flour grade 550<br>73 kg water<br>3 kg yeast<br>2.5 kg salt<br>2.5 kg organic acids | 80 kg rye flour grade 1150<br>20 kg wheat flour grade 550<br>76 kg water<br>3 kg yeast<br>2.5 kg salt<br>2.5 kg organic acids |
| Blended rye flour bread 60:40 | Blended rye flour bread 50:50 |
| 60 kg rye flour grade 1150<br>40 kg wheat flour grade 550<br>71 kg water<br>3 kg yeast<br>2.5 kg salt<br>2.5 kg organic acids | 50 kg rye flour grade 1150<br>50 kg wheat flour grade 550<br>70 kg water<br>3 kg yeast<br>2.5 kg salt<br>2.5 kg organic acids |

The results of the baking tests are shown in table 4 below. The stated four ratios refer to the ratio of rye flour to wheat flour.

TABLE 4

| | Control without TG | TG | Control without TG | TG | Control without TG | TG | Control without TG | TG |
| --- | --- | --- | --- | --- | --- | --- | --- | --- |
| Flour ratio | 80/20 | 80/20 | 70/30 | 70/30 | 60/40 | 60/40 | 50/50 | 50/50 |
| Baked volume | 100% | 104% | 100% | 105% | 100% | 107% | 100% | 107% |
| Dough properties | soft, sticky | somewhat soft, somewhat sticky | somewhat soft, sticky | just soft, just sticky | somewhat soft, somewhat sticky | just soft, just sticky | somewhat to just soft, just sticky | normal |
| Loaf shape | somewhat flat - flat | normal - just round | somewhat flat | just round | somewhat flat | somewhat round | normal | round |

The results shown above indicate that loaf shape and dough stability are improved even with a rye flour proportion of 80%.

Example 3
Effect of Transglutaminase on Blended Rye Flour Dough with Direct and Indirect Processing Bread was made using dough prepared according to the following recipe.

Blended rye flour bread 70:30 sponge and dough (indirect processing)

70 kg rye flour grade 1150

30 kg wheat flour grade 550

71 kg water 3 kg yeast 2.5 kg salt 50 kg of the rye flour were acidified

Leavened dough:

100 kg rye flour grade 1150

80 kg water 1 kg Reinzuchtsauer [leaven type]

Dough temperature 32° C.

Maturation time: 18 h at room temperature

The results of the baking test are shown in tables 5 and 6 below.

TABLE 5

| | direct processing, organic acids | | | | | | |
| --- | --- | --- | --- | --- | --- | --- | --- |
| | Control<br>0 TGU | TG<br>300 TGU | TG<br>500 TGU | TG<br>1000 TGU | TG<br>1200 TGU | TG<br>1600 TGU | TG<br>2000 TGU |
| Baked volume | 100% | 104% | 106% | 102% | 100% | 99% | 100% |
| Dough properties | somewhat soft, somewhat sticky | normal, easily processed | normal, easily processed | just dry, somewhat tough | dry, non-elastic, dough tears during processing | dry, non-elastic, dough tears during processing | dry, non-elastic, dough tears during processing |
| Loaf shape | somewhat flat | normal to just round | somewhat round | too round | much too round | much too round, crust is torn | much too round, crust is torn |

TABLE 6

Leaven processing, Detmolder Einstufensauer [leaven type]

|  | Control 0 TGU | TG 300 TGU | TG 500 TGU | TG 1000 TGU | TG 1200 TGU | TG 1600 TGU | TG 2000 TGU |
|---|---|---|---|---|---|---|---|
| Baked volume | 100% | 101% | 100% | 103% | 104% | 105% | 105% |
| Dough properties | somewhat soft, somewhat sticky | somewhat soft, somewhat sticky, not smeary | just soft, just sticky | just soft, just sticky | just soft to normal | normal, easily processed | normal, easily processed |
| Loaf shape | somewhat flat | somewhat flat | just flat | just flat to normal | just flat to normal | normal | normal to somewhat round |

The above results show that both for direct and for indirect dough processing the properties of both the dough and the baked product can be improved.

Example 5

Effect of the Transglutaminase on the Stability of the Fermentation

With a dough as detailed in the recipe in example 3, a baking test was performed after fermentation times of 35 min. (+10% fermentation time) and 45 min. (+20% fermentation time).

The results are shown in table 7.

TABLE 7

|  | Control 0 TGU | TG 100 TGU | TG 200 TGU | TG 300 TGU |
|---|---|---|---|---|
|  | Loaf shape | | | |
| Normal fermentation | somewhat flat | normal | just round | just round - somewhat round |
| Plus 10% fermentation time | flat | just flat | normal | just round - normal |

TABLE 7-continued

|  | Control 0 TGU | TG 100 TGU | TG 200 TGU | TG 300 TGU |
|---|---|---|---|---|
| Plus 20% fermentation time | flat | just flat | normal to just flat | normal |

The results indicate that the use of transglutaminase permits an extension of the fermentation time by up to 20%. Without transglutaminase, flat, no longer acceptable loafs were baked, while the addition of transglutaminase resulted in a pleasing loaf shape.

Example 6

Effect of Transglutaminase in Combination with Other Baking Enzymes

Baking tests using transglutaminase in combination with fungal xylanase (f-xylanase) or bacterial xylanase (b-xylanase) were carried out. The enzyme doses are with respect to 100 kg of flour. The experiments were made with 70% rye flour grade 997 (compare with example 1). The dough was acidified using organic acids. In order to allow a comparison, experiments with the pure fungal or bacterial xylanase were also carried out. The results are shown in tables 8 and 9 below.

TABLE 8

|  | Control | 200 TGU + 6000 XylH f-xylanase | 200 TGU + 5000 XylH f-xylanase | 200 TGU + 4000 XylH f- | 6000 XylH P-Xylanase | 5000 XylH P-Xylanase | 4000 XylH P-Xylanase |
|---|---|---|---|---|---|---|---|
| Baked volume | 100% | 119% | 116% | 115% | 120% | 116% | 116% |
| Dough properties | somewhat soft, somewhat sticky | just soft, just sticky | normal | normal | soft, somewhat sticky, moist | somewhat soft, just sticky | somewhat soft |
| Loaf shape | somewhat flat | normal | normal-just round | somewhat round | flat | somewhat flat | somewhat flat-just flat |

TABLE 9

|  | Control | 200 TGU + 600 XylH | 200 TGU + 800 XylH | 200 TGU + 1000 XylH b- | 600 XylH b-xylanase | 800 XylH b-xylanase | 1000 XylH b-xylanase |
|---|---|---|---|---|---|---|---|
| Baked volume | 100% | 116% | 119% | 121% | 120% | 116% | 116% |
| Dough properties | somewhat soft, somewhat sticky | normal | normal to just soft, just sticky | just soft, just sticky | just soft, somewhat sticky | somewhat soft, somewhat sticky | soft |
| Loaf shape | somewhat flat | somewhat round | normal-somewhat round | normal | flat | somewhat flat | somewhat flat-just flat |

It appears that the utilization of transglutaminases results in superior dough properties and an improved loaf shape, compared to the utilisation of a xylanase compound alone.

The same experiment was repeated, however, with the addition of a fungal cellulase originating from Trichoderma ssp. The enzyme doses are with respect to 100 kg of flour. The results are shown in table 10 below.

It is obvious that the addition of transglutaminase significantly improves the properties of the dough and the loaf shape.

Example 8

Bread made from three flour types were baked. For the recipe for sourdough rye bread, refer to example 3. Wheat

TABLE 10

|  | Control | 200 TGU + 19*10$^6$ CU fungal cellulase | 200 TGU + 38*10$^6$ CU fungal cellulase | 200 TGU + 77*10$^6$ CU fungal | 19*10$^6$ CU fungal | 38*10$^6$ CU fungal | 77*10$^6$ CU fungal cellulase |
|---|---|---|---|---|---|---|---|
| Baked volume | 100% | 109% | 111% | 112% | 103% | 104% | 104% |
| Dough properties | somewhat soft, somewhat sticky | normal | normal | normal | just soft, just sticky, | just soft, just sticky | just soft, just sticky |
| Loaf shape | somewhat flat | normal-somewhat round | normal to just round | normal to just round | just flat | just flat | just flat |

The addition of transglutaminase results in superior dough properties and an improved loaf shape, compared to that with the utilisation of fungal cellulase alone.

Example 7
Baking Tests with Special Flour Types and the Addition of Transglutaminase Baking tests with special flour types were carried out. Blends of 50 or 60% maize flour or 50/60% oat flour with wheat flour were used. The transglutaminase dose is always with respect to 100 kg of flour. The results are shown in tables 11 and 12 below.

flour at 40%, rye flour at 40% and oat flour at 20%, with respect to the total flour quantity, were used. The TG doses are with respect to 100 kg of flour.

The following recipe was used:
40 kg wheat flour grade 550
40 kg rye flour grade 1150
20 kg oat flour
2.5 kg salt
3 kg yeast
all of the rye flour was acidified

TABLE 11

|  | Maize flour 50% wheat flour 50% | Maize flour 60% wheat flour 40% | Maize flour 50% wheat flour 50% | Maize flour 60% wheat flour 40% | Maize flour 50% wheat flour 50% | Maize flour 60% wheat flour 40% | Maize flour 50% wheat flour 50% | Maize flour 60% wheat flour 40% |
|---|---|---|---|---|---|---|---|---|
| Enzyme dose | 0 TGU | 0 TGU | 300 TGU | 300 TGU | 100% | 100% | 600 TG | 600 TG |
| Baked volume | 100% | 100% | 104% | 103% | soft, | too soft, | 105% | 105% |
| Dough properties | soft, sticky | too soft, sticky | somewhat-just soft, somewhat sticky | somewhat soft, somewhat sticky | sticky | sticky | just soft, somewhat sticky | somewhat-just soft, somewhat sticky |
| Loaf shape | flat | flat | somewhat flat | somewhat flat | flat | flat | just flat | somewhat flat |

TABLE 12

|  | Oat flour 50% wheat flour 50% | Oat flour 60% wheat flour 40% | Oat flour 50% wheat flour 50% | Oat flour 60% wheat flour 40% | Oat flour 50% wheat flour 50% | Oat flour 60% wheat flour 40% | Oat flour 50% wheat Hour 50% | Oat flour 60% wheat flour 40% |
|---|---|---|---|---|---|---|---|---|
| Enzyme dose |  |  | 300 TG | 300 TG |  |  | 600 TG | 600 TG |
| Baked volume | 100% | 100% | 102% | 102% | 100% | 100% | 105% | 105% |
| Dough properties | soft, sticky | too soft, sticky flowing | somewhat soft, somewhat sticky | somewhat soft, somewhat sticky | soft, sticky | too soft, sticky, flowing | just soft, somewhat sticky | somewhat-just soft, somewhat sticky |
| Loaf shape | flat | flat | somewhat flat | somewhat flat | flat | flat | just flat | somewhat flat |

The following results were obtained:

TABLE 13

| | Enzyme dose | | | | | | | |
|---|---|---|---|---|---|---|---|---|
| | Control | 300 TG | 600 TG | 900 TG | 1200 TG | 1500 TG | 1800 TG | 2100 TG |
| Baked volume | 100% | 103% | 104% | 104% | 106% | 105% | 105% | 106% |
| Dough properties | too soft-flowing, sticky | soft sticky | somewhat just soft, somewhat sticky | just soft, just sticky | just soft, just sticky | just soft, just sticky | just soft, just sticky | just soft, just sticky |
| Loaf shape | flat | flat | somewhat flat | just flat | just flat | just flat | just flat | just flat |

In addition, bread made from 4 flour types was baked. Wheat flour at 50%, oat flour at 30%, maize flour at 10% and potato flour at 10% with respect to the total flour quantity were used. The TG doses are with respect to 100 kg of flour. For the recipe for leavened rye bread refer to example 3.

The following recipe was used:

50 kg wheat flour grade 550
30 kg oat flour
10 kg maize flour
10 kg potato flour
2.5 kg salt
3 kg yeast
2 kg dough acidifier (organic acids)

The following results were obtained:

TABLE 14

| | Enzyme dose | | | | | | | |
|---|---|---|---|---|---|---|---|---|
| | Control | 300 TG | 600 TG | 900 TG | 1200 TG | 1500 TG | 1800 TG | 2100 TG |
| Baked volume | 100% | 104% | 106% | 106% | 107% | 106% | 106% | 107% |
| Dough properties | too soft, sticky | soft sticky | somewhat soft, somewhat sticky | just soft, just sticky | just soft, just sticky | just soft, just sticky | just soft, just sticky | just soft, just sticky |
| Loaf shape | flat | flat | somewhat flat | somewhat flat | just flat | just flat | just flat | just flat - normal |

The results shown above indicate that transglutaminase is of beneficial effect to the properties of dough and baked product for flour blends containing more than two flour components. In particular, the reduction in the stickiness of the dough and the increase in the elasticity of the dough must be emphasized. The loaf volumes reached are also pleasing. They are much higher than those produced in the controls. The improved properties of the dough, loaf volume and loaf shape allow a sellable product to be made from special flours as well as wheat flour.

German application 100 46 605.2 filed Sep. 20, 2000 is hereby incorporated by reference in its entirety.

What is claimed is:

1. A method for the preparation of a mixed flour comprising mixing a transglutaminase, a wheat flour, and a non-wheat flour, wherein said mixed flour comprises 1 to 50% by weight wheat flour based on the total weight of flour in said mixed flour.

2. The method as claimed in claim 1, wherein the mixed flour comprises 5 to 50 wt. % of wheat flour.

3. The method as claimed in claim 1, wherein the mixed flour comprises 10 to 50 wt. % of wheat flour.

4. The method as claimed in claim 1, wherein the mixed flour comprises 30 to 50 wt. % of wheat flour.

5. The method as claimed in claim 1, wherein the wheat flour comprises other baking additives selected from the group consisting of non-transglutaminase enzymes, salt, sugar, emulsifiers, and organic acids.

6. The method as claimed in claim 5, wherein the baking additive is an enzyme selected from the group consisting of amylases, xylanases, pentosanases, hemicellulases, cellulases, endoglucanases, β-glucanases, phospholipases, lysophospholipases, phytases, phosphatases, lipases, lipoxygenases, oxidases, peroxidases, and mixtures thereof.

7. The method as claimed in claim 1, wherein the wheat flour comprises a baking additive selected from the group consisting of an organic acid, a dried leaven, an unprocessed leaven, a yeast, and mixtures thereof.

8. The method as claimed in claim 1, wherein the transglutaminase is mixed in an amount of 10 to 5000 TGU per 100 kg of said mixed flour.

9. The method as claimed in claim 1, wherein the transglutaminase is mixed in an amount of 5 to 5000 TGU per 100 kg of said mixed flour.

10. The method as claimed in claim 1, wherein the transglutaminase is mixed in an amount of 10 to 2000 TGU per 100 kg of said mixed flour.

11. The method as claimed in claim 1, wherein the transglutaminase is mixed in an amount of 30 to 300 TGU per 100 kg of said mixed flour.

12. The method as claimed in claim 1, wherein the non-wheat flour is selected from the group consisting of rye flour, oat flour, barley flour, maize flour, buckwheat flour, millet flour, quinoa flour, amaranth flour, potato flour, flour made from a leguminous plant, and mixtures thereof.

13. The method as claimed in claim 12, wherein the non-wheat flour is rye flour.

14. The method as claimed in claim 12, wherein the non-what flour is oat flour.

15. A mixed flour comprising 1 to 50 wt. % of wheat flour based on the total weight of the flour in the mixed flour, one or more non-wheat flours, and a transglutaminase.

16. The mixed flour claimed in claim 15, wherein the mixed flour comprises 5 to 50 wt. % wheat flour.

17. The mixed flour claimed in claim 15, wherein the mixed flour comprises 10 to 50 wt. % wheat flour.

18. The mixed flour claimed in claim 15, wherein the mixed flour comprises 30 to 50 wt. % wheat flour.

19. The mixed flour claimed in claim 15, further comprising a baking additive selected from the group consisting of non-transglutaminase enzymes, salt, sugar, emulsifiers, and organic acids.

20. The mixed flour claimed in claim 19, wherein the baking additive is an enzyme selected from the group consisting of amylases, xylanases, pentosanases, hemicellulases, cellulases, endoglucanases, β-glucanases, phospholipases lysophospholipases, phytases, phosphatases, lipases, lipoxygenases, oxidases, peroxidases, and mixtures thereof.

21. The mixed flour claimed in claim 15, further comprising a baking additive selected from the group consisting of an organic acid, a dried leaven, an unprocessed leaven, a yeast, and mixtures thereof.

22. The mixed flour of claim 15, comprising 5 to 5000 TGU per 100 kg of flour.

23. The mixed flour claimed in claim 15, comprising 10 to 2000 TGU per 100 kg of flour.

24. The mixed flour claimed in claim 15, comprising 30 to 300 TGU per 100 kg of flour.

25. The mixed flour of claim 15, wherein the non-wheat flour is selected from the group consisting of rye flour, oat flour, barley flour, maize flour, buckwheat flour, millet flour, quinoa flour, amaranth flour, potato flour, a flour made from a leguminous plant, and mixtures thereof.

26. The mixed flour as claimed in claim 25, wherein the non-wheat flour is rye flour.

27. The mixed flour of claim 15 wherein the transglutaminase is produced by cultures of microorganisms.

28. A method of baking, comprising heating a dough, said dough comprising the mixed flour in claim 15.

* * * * *

UNITED STATES PATENT AND TRADEMARK OFFICE
CERTIFICATE OF CORRECTION

PATENT NO.   : 6,517,874 B2
DATED        : February 11, 2003
INVENTOR(S)  : Frank Schuhmann It is certified that error appears in the above-identified patent and that said Letters Patent is hereby corrected as shown below:

Column 12,
Table 12,

TABLE 12

| | Oat flour 50% wheat flour 50% | Oat flour 60% wheat flour 40% | Oat flour 50% wheat flour 50% | Oat flour 60% wheat flour 40% | Oat flour 50% wheat flour 50% | Oat flour 60% wheat flour 40% | Oat flour 50% wheat flour 50% | Oat flour 60% wheat flour 40% |
|---|---|---|---|---|---|---|---|---|
| Enzyme dose | | | 300 TG | 300 TG | | | 600 TG | 600 TG |
| Baked volume | 100% | 100% | 102% | 102% | 100% | 100% | 105% | 105% |
| Dough properties | soft, sticky | too soft, sticky flowing | somewhat soft, somewhat sticky | somewhat soft, somewhat sticky | soft, sticky | too soft, sticky, flowing | just soft, somewhat sticky | somewhat-just soft, somewhat sticky |
| Loaf shape | flat | flat | somewhat flat | somewhat flat | flat | flat | just flat | somewhat flat | should read

TABLE 12

| | Oat flour 50% wheat flour 50% | Oat flour 60% wheat flour 40% | Oat flour 50% wheat flour 50% | Oat flour 60% wheat flour 40% | Oat flour 50% wheat flour 50% | Oat flour 60% wheat flour 40% | Oat flour 50% wheat flour 50% | Oat flour 60% wheat flour 40% |
|---|---|---|---|---|---|---|---|---|
| Enzyme dose | | | 300 TG | 300 TG | | | 600 TG | 600 TG |
| Baked volume | 100% | 100% | 102% | 102% | 100% | 100% | 105% | 105% |
| Dough properties | soft, sticky | too soft, sticky flowing | somewhat soft, somewhat sticky | somewhat soft, somewhat sticky | soft, sticky | too soft, sticky, flowing | just soft, somewhat sticky | somewhat-just soft, somewhat sticky |
| Loaf shape | flat | flat | somewhat flat | somewhat flat | flat | flat | just flat | somewhat flat |

Column 14,
Line 58, "non-what" should read -- non-wheat --.

Signed and Sealed this

Twenty-second Day of July, 2003

JAMES E. ROGAN
*Director of the United States Patent and Trademark Office*